Aug. 9, 1927.
T. A. SMYTHE
1,638,066
GASOLINE STRAINER FOR AUTOMOBILES
Filed June 14, 1926
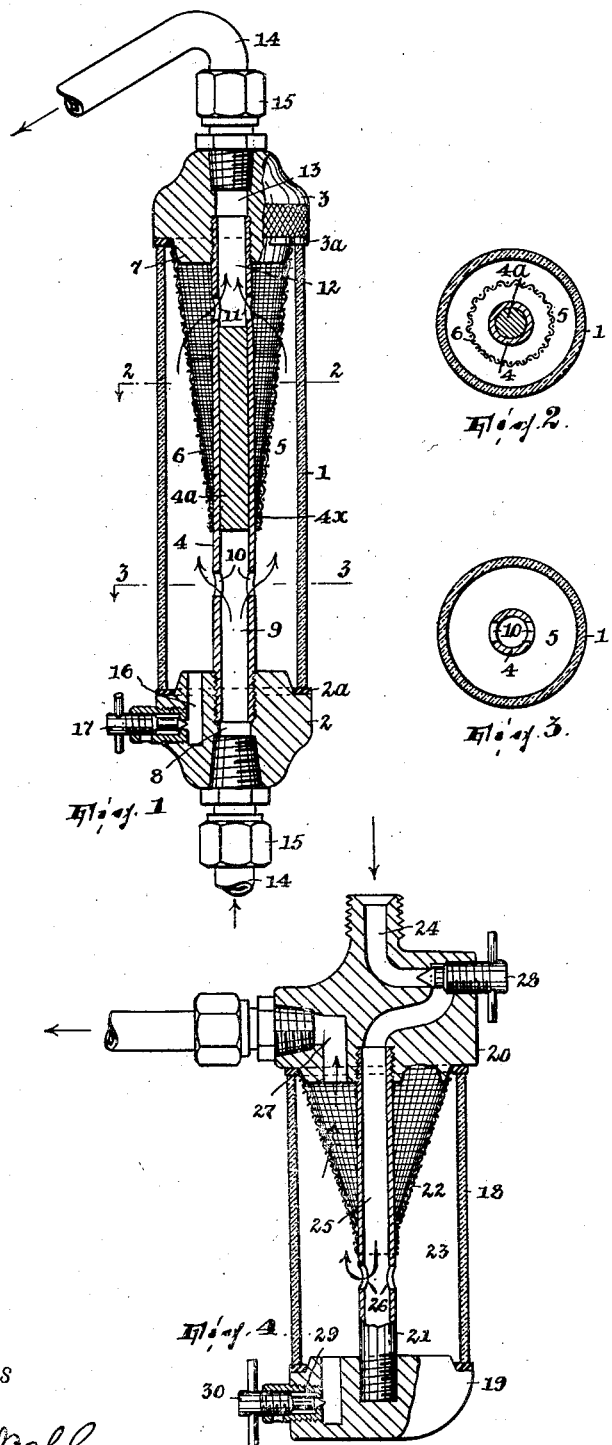
WITNESS
INVENTOR,
Thomas A. Smythe,
BY
ATTORNEY Patented Aug. 9, 1927.

1,638,066

UNITED STATES PATENT OFFICE.

THOMAS A. SMYTHE, OF PATERSON, NEW JERSEY.

GASOLINE STRAINER FOR AUTOMOBILES.

Application filed June 14, 1926. Serial No. 115,816.

This invention relates to devices for filtering liquids, as the gasoline used in automobiles, and its objects are to provide a device of this character which may be manufactured and sold at relatively small cost and yet be efficient in operation, to construct the device so that it may be readily taken apart for cleaning of the filter element, repairs, etc., and to provide at all times for a clear disclosure of the condition of its interior, to wit, as to the collection of water or sediment therein.

I have shown the invention herein in two forms, one in which the induction and eduction of the liquid takes place at opposite ends of the device and the other in which both induction and eduction take place at one end of the device.

Figs. 1, 2 and 3 show the first form,

Fig. 1 being a vertical sectional view; and Figs. 2 and 3 sectional views on lines 2—2 and 3—3, respectively; and Fig. 4 showing the other form, being a vertical sectional view.

In Figs. 1 to 3: 1 is a tubular shell, preferably of transparent glass, and 2 and 3 are lower and upper heads which may have elastic gaskets 2ª and 3ª abutting the ends of the shell so as to seal the joints at these points. 4 is a stem which separably connects the two heads, in the present case by having its ends threaded and tapped into both of them, as shown. These parts form the filter casing, the space 5 contained within the shell and between the two heads being what I term the filter space.

In the filter space is a stiff reticulated element or wire screen 6 of conical form. This is arranged concentric with respect to the stem and it has its smaller end soldered or otherwise rigidly affixed at 4ˣ to the stem and its larger end in continuous contact with one head (as the head 3), as by said head having a conical projection 7 over which said larger end of said screen fits. The construction is such that when the case is taken apart the stem and screen remain as a unit.

The casing has means to conduct liquid into the filter space at one side of the screen and means to conduct liquid from said space at the other side of the screen; and by the term "sides" as herein used in connection with the screen I of course mean its exterior and interior conical surfaces or sides. The first of these means is in the present case formed by a port 8 in the lower head which communicates with the passage 9 formed axially through the stem 4 and having its outlet to said space at 10 exterior of the screen. The other of said means is formed by the inlet or inlets 11 in the stem 4 of an axial passage 12 in said stem and a port 13 in head 3 with which passage 12 communicates, said inlets being within the screen. The ports 8 and 13 may be connected as by the unions 15, in any suitable way with the ends of the pipe 14 in which the device is installed and through which the liquid to be filtered flows. 16 is a suitable port for draining the casing of water or sediment which collects therein, and 17 is a needle valve for controlling this port.

In Fig. 4: Here 18 is the shell, 19 and 20 are the heads, 21 is the stem and 22 the conical screen, rigidly secured to the stem in concentric relation thereto at its smaller end and having its larger end abutting one head. Excepting as hereinafter indicated, the parts are all the same as those already described and together, as before, form the filter casing, with its filter space 23. In the present case, the means to conduct the liquid into the filter space at one side of the screen and the means to conduct liquid from said space at the other side of the screen appertain to but one head, to wit, that head against which the larger end of the screen abuts, or in the present case the upper head 20. The first of these means is formed by a port 24 in the head, and a passage 25 communicating with said port and formed axially in the stem and having its outlet at 26 exterior of the screen. The other of said means is formed by a port 27 which leads through the head 20 at a point within the screen to the exterior of the head. The ports 24 and 27 will of course be connected with the ends of the pipe for conducting the liquid to the filter. Since, as shown in the present instance, the liquid enters the device by gravity from the top there may be a needle valve 28 for cutting off the flow when required. 29 and 30 indicate a drain port and its needle valve corresponding to the parts 16 and 17 already described.

The device is not only inexpensive to manufacture because of its simple construction, but very compact, and when taken apart for any purpose, as for cleaning the filter element or renewing the glass shell when broken, it resolves itself into but a few parts, one of which is a complete or unitary element consisting of the stem and the screen rigidly affixed thereto; further, because the screen is rigidly affixed to the stem and is stiff and so forms therewith a unitary element it can be handled without damage and the assembling with the head (as 3) with which it coacts is facilitated, mere continuous contact with such head being sufficient.

In both forms the stem is afforded by a tube, which in the first form is plugged, as at 4ª, to isolate passages 9 and 13.

In both forms the screen surrounds the projection 7 and is surrounded by the gasket, and it snugly fits the projection and is snugly embraced by the gasket; this relation of the parts is preferably attained by the diameter of the gasket being such that it requires a little pressure to force it over the telescoped screen and projection to its seat against the head. The object of this detail of the invention is to insure against any leakage of gasoline past the larger end of the screen.

Having thus fully described my invention what I claim and desire to secure by Letters Patent is:

1. A casing including a plurality of parts together forming a filter space, and a stem separably connecting said parts and extending through said space, in combination with a stiff filter screen surrounding the stem and formed as a sharply tapered cone whose smaller end approximates the stem in diameter and being fixed at such end to the stem and at its larger end abutting one of said parts, such part having a projection concentric with and fitting within said larger end of the screen and said casing having means to conduct liquid into said space at one side of the screen and means to conduct liquid from said space at the relatively opposite side of the screen.

2. In combination, a casing including a plurality of parts together forming a filter space and a stem separably connecting said parts and extending through said space, one of said parts having a projection extending into the other part, a gasket interposed between said parts, and a hollow filter screen concentric with and embracing the stem at its smaller end and at its larger end surrounding and snugly fitting said projection and being surrounded and snugly fitted by the gasket, said casing having means to conduct liquid into said space at one side of the screen and means to conduct liquid from said space at the relatively opposite side of the screen.

In testimony whereof I affix my signature.

THOMAS A. SMYTHE.